W. H. DAILY.
TALKING MACHINE.
APPLICATION FILED FEB. 23, 1915.
1,168,606.
Patented Jan. 18, 1916.
3 SHEETS—SHEET 1.
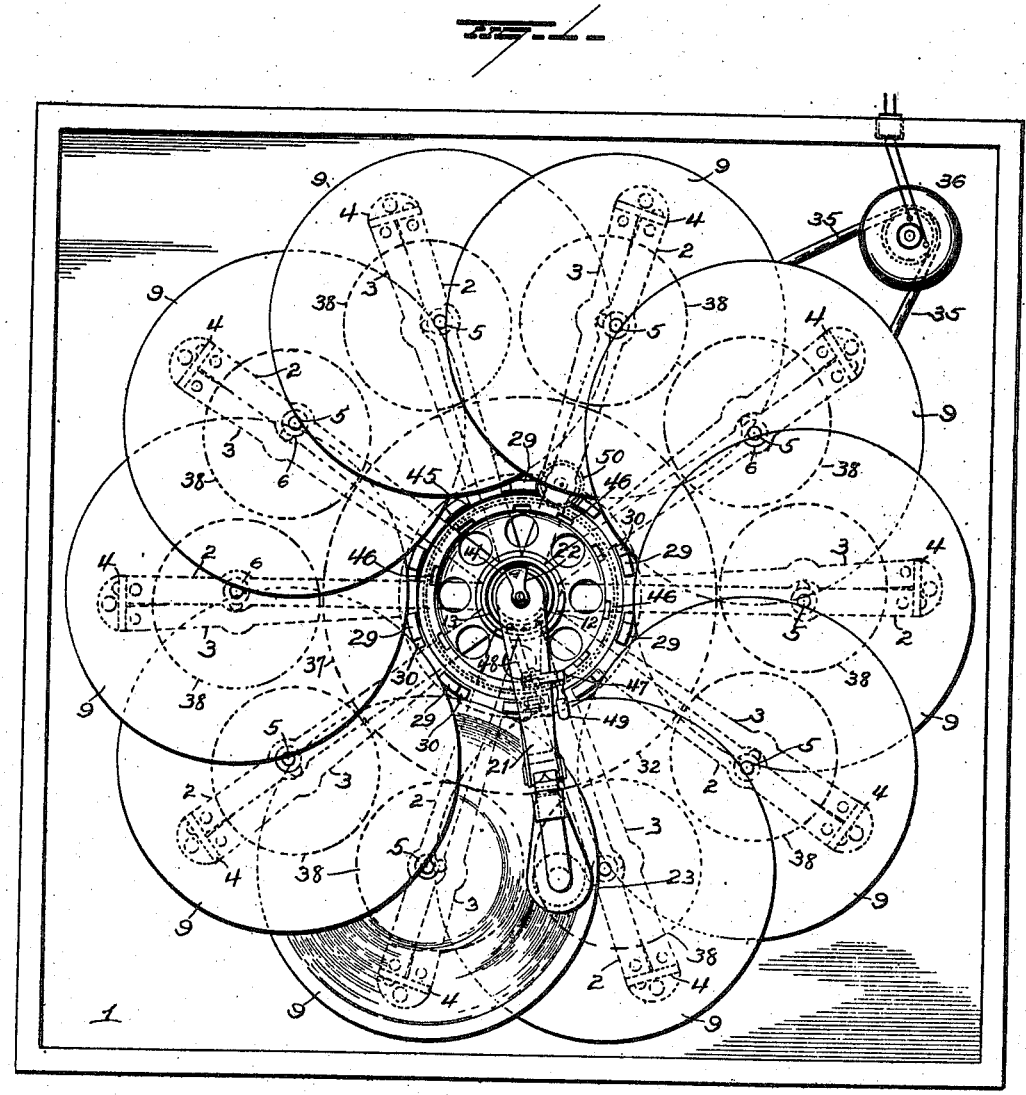
WITNESSES
INVENTOR

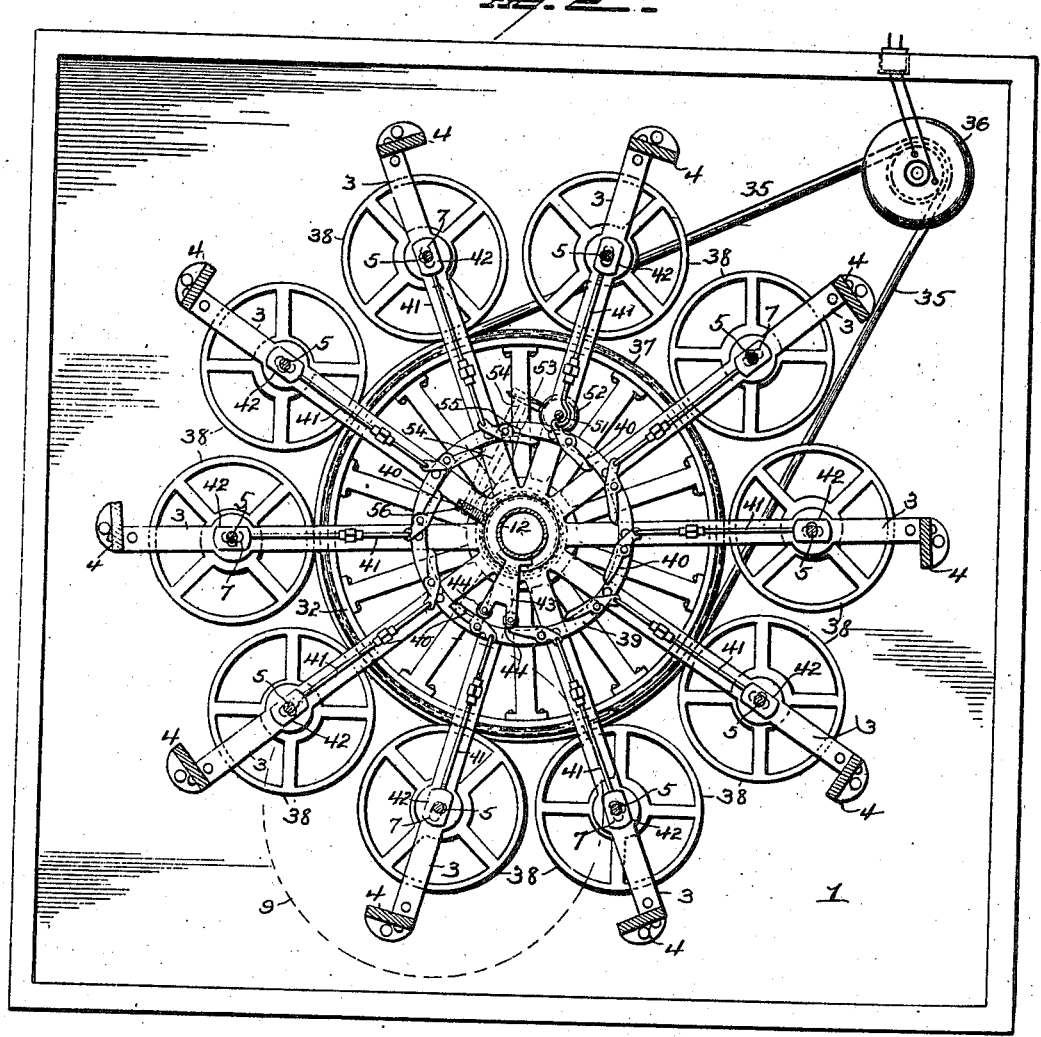

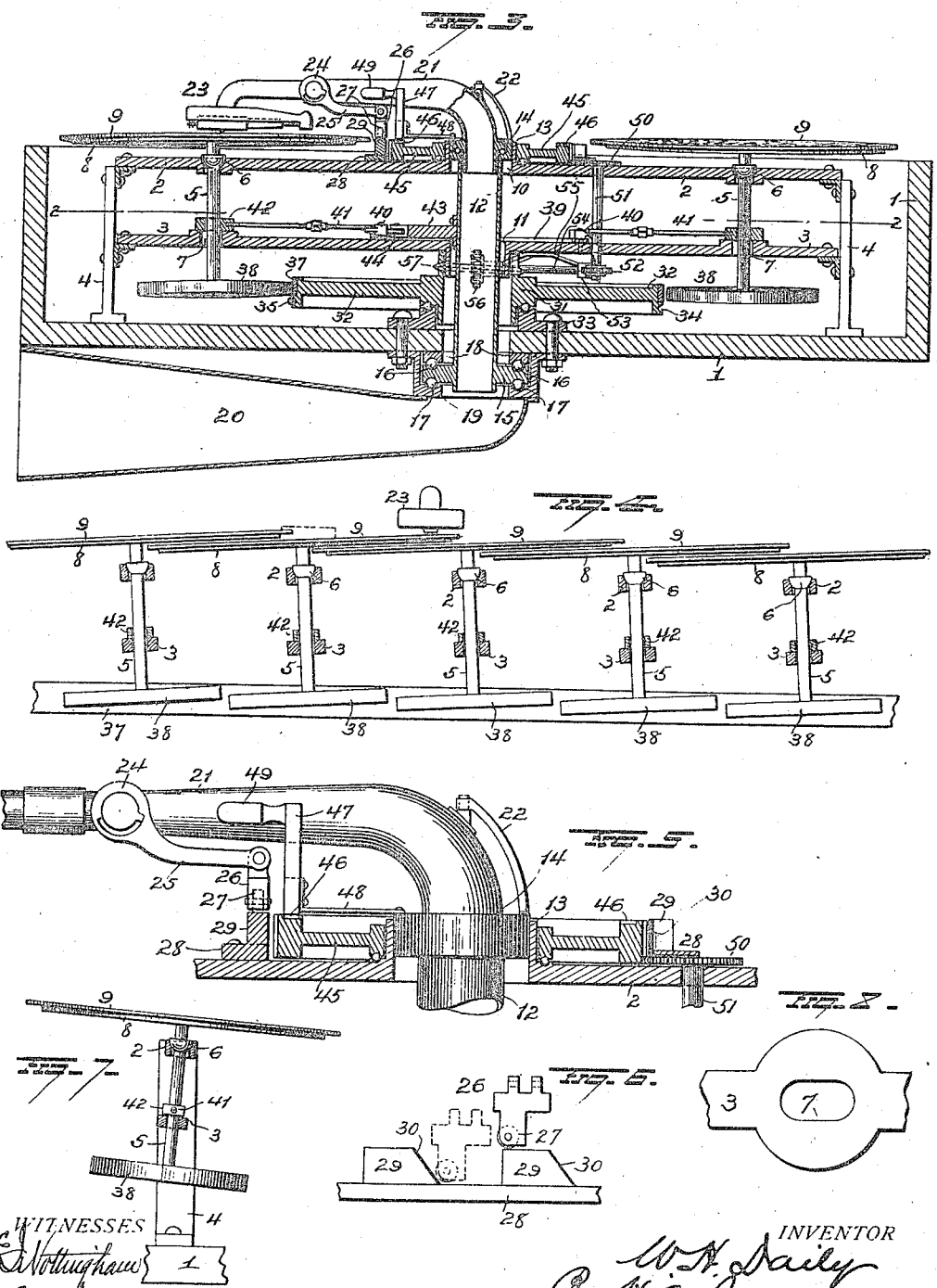

UNITED STATES PATENT OFFICE.

WILLIAM H. DAILY, OF TUCSON, ARIZONA.

TALKING-MACHINE.

1,168,606. Specification of Letters Patent. Patented Jan. 18, 1916.

Application filed February 23, 1915. Serial No. 10,073.

*To all whom it may concern:*

Be it known that I, WILLIAM H. DAILY, a citizen of the United States, and a resident of Tucson, in the county of Pima and State of Arizona, have invented certain new and useful Improvements in Talking-Machines; and I do hereby declare the following to be a full, clear, and exact description of the invention, such as will enable others skilled in the art to which it appertains to make and use the same.

This invention relates to improvements in talking machines, and more particularly to such as employ a plurality of records which may be played successively,—one object of the invention being to provide means which will operate automatically to cause the playing of a plurality of records successively without the necessity of shifting the records from their supporting tables.

A further object is to provide a multi-record talking machine with means which will operate automatically to shift the reproducer from one record to the other, whereby the several records may be played successively.

A further object is to so construct a multi-record talking machine, that it will operate automatically to cause the rotation of one record at a time and to shift the reproducer progressively from one record to another.

A further object is to so construct the machine that the rotation of one record will be stopped and the rotation of the next record will be started when the reproducer is automatically shifted from one of said records to the other.

A further object is to so construct a talking machine of the disk-record type, as to overcome the effect of centrifugal force tending to cause the needle of the reproducer to engage only the outer wall of the record groove, and thus insure the proper and accurate maintenance of the needle in said record groove.

With these and other objects in view, the invention consists in certain novel features of construction and combinations of parts as hereinafter set forth and pointed out in the claims.

In the accompanying drawings; Figure 1 is a plan view of a talking machine embodying my improvements; Fig. 2 is a horizontal sectional view on the line 2—2 of Fig. 3; Fig. 3 is a transverse vertical section; Fig. 4 is a view partly in section and partly in elevation showing the relative arrangement and disposition of the record disks and their supporting means, this view being diagrammatical in character and showing several disks and their supporting and driving means in a straight line instead of in their normal circular arrangement; Fig. 5 is an enlarged section view, partly in elevation, showing the horn tubes and coöperating parts at the central portion of the machine, and Figs. 6, 7 and 8 are detail views.

1 represents a casing, in which upper and lower frames 2, 3, are located, each of said frames comprising a circular series of radiating arms or bars supported at their outer ends by standards 4. In the drawing, each frame is shown as comprising ten arms or bars and the axes of the arms or bars of the lower frame are somewhat out of vertical alinement with the arms or bars of the upper frame, as shown in Figs. 4 and 7, so that shafts 5 passing through the pairs of superimposed bars of the respective frames will be disposed in inclined positions, for a purpose hereinafter explained. Ball-and-socket bearings 6 are provided for the shafts 5 in the bars of the upper frame, and the bars of the lower frame are made with slots 7 for the passage of the shafts,—said slots being elongated in a direction at substantially right angles to the direction of inclination of said shafts. The several upright shafts 5 carry platforms 8 at their upper ends for the reception of phonograph record disks 9, each of said platforms being disposed at right angles to the axis of the shaft 5 to which it is secured. It will be observed that the disk supporting platforms are arranged in annular or circular formation; that the shafts 5 are located in such proximity to each other as to cause the platforms and the record disks thereon to progressively overlie each other, and that as said platforms and disks are inclined in directions approximately at right angles to lines radiating from the common vertical axis of the two frames 2—3, all of the disks of the circular series will be in approximately the same general plane with the peripheral portions of all the disks approximately equal distances from the central portions of adjacent disks, and thus the accuracy of the shifting of the reproducer progressively from disk to disk, as hereinafter explained, will be facilitated. Inclining the record disks as above described also is of great advantage in insuring accuracy and clearness of phonographic reproduction. It has been the common practice to dispose disk records in a horizontal plane and the consequence of this is that, owing to centrifugal force during the rotation of the disk, the needle of the reproducer will tend to press outwardly and thus bear with greatest pressure against the outer wall of the groove of the record. By inclining the disk, such effect of centrifugal force is overcome, and the reproducer needle is caused to accurately follow the groove throughout its varied contour.

The central portions of the respective frames are made with openings 10—11 for the accommodation of a vertical horn tube 12, and surrounding the opening 10 of the upper frame is an annular flange 13 in which a recessed head 14 at the upper end of said horn tube is mounted to rotate. The lower end of the horn tube 14 is provided with a circular flange 15 having grooves in its upper and lower faces for the accommodation of antifriction balls 16—17,—the balls 16 also having bearings in a grooved ring 18 on the bottom of the casing 1 and the balls 17 having bearings in a groove in a flanged ring 19 also secured to the bottom of the casing. To the flanged ring 19, the smaller end of a horn 20 is secured so as to communicate with the lower end of the rotatable horn tube 12. The depending elbow of a tubular arm 21 has a ball-bearing mounting in the head 14 at the upper end of the vertical horn tube, and said tubular arm, which constitutes an upper member of the horn tube is supported by an arm 22 projecting upwardly from the head 14. The tubular arm or horn tube extension is disposed horizontally and constitutes the carrier for the reproducer 23, the tubular shank of the latter being connected with the arm 21 by means of a tubular coupling 24 hinged to the latter in such manner as to permit the reproducer to be raised. During the operation of the machine, the reproducer will be raised from one record and subsequently lowered upon the next record, and to accomplish these movements automatically, the hinged coupling 24 with which the reproducer is connected, is provided with an arm 25 to which a weight 26 is attached, said weight having a roller 27 to engage a ring 28 located upon the upper frame 2 and provided with a plurality of lugs 29 each having a forwardly inclined wall 30. When tubular arm 21 shall have moved over the disk until the reproducer shall have fully passed over the record groove on a disk 9, the weight 26 will drop in a space between two lugs 29 on ring 28 and thus operate, through the medium of the arm 25 and tubular hinged coupling 24, to raise the reproducer off the disk, and as said arm or horn tube extension 21 continues to move laterally, the roller 27 on weight 26, will ride up the inclined face 30 of the next lug 29 and thus cause the reproducer to be lowered and placed in operative relation to the next disk 9 of the series,—all as more particularly hereinafter pointed out.

The hub 31 of a horizontally disposed driving wheel 32 encircles the vertical horn tube 12 and has an anti-friction bearing upon a ring 33 secured within the bottom of the casing 1. The wheel 32 is made with a peripheral groove 34 to receive a driving belt 35, by means of which, motion is imparted to said wheel from a motor 36, the latter being preferably an electric motor. The wheel 32 is also provided with a peripheral facing 37 of leather or other friction material to insure proper transmission of power to wheels 38 at the lower ends of the shafts 5 for the purpose of rotating the record disks.

Means are provided for causing the rotation of one record disk at a time during the playing of a record,—all of the other disks remaining idle,—and to throw said record disks progressively into and out of operation.

The devices whereby these operations are accomplished automatically, will now be explained. A ring 39 concentric with the vertical horn tube 12 is mounted upon the bars of the lower frame 3 and to this ring, a plurality of small levers 40 are pivotally connected, said levers corresponding in number with that of the disk carriers employed. The short arms of the levers 40 are connected, by means of adjustable rods 41 with blocks 42 freely mounted upon the bars of frame 3 and perforated for the passage of the shafts 5. An arm 43 is rigidly secured to the vertical horn tube 12 so as to move laterally when said tube turns during the travel of the reproducer over a record disk. The arm 43 is preferably bifurcated at its free end and in each member of this bifurcated portion, a roller 44 is mounted to engage the long arms of the levers 40. During the operation of the machine, the engagement of the rollers 44 on arm 43 with the long arm of one of the levers, will cause the block 42 connected with this lever to be moved inwardly and the wheel 38 on the shaft 5 engaged by said block will be moved into contact with the friction face 37 of the driving wheel 32,—thus causing the record disk carried by said shaft to be rotated. When the playing of this disk shall have been completed, and the reproducer is being transferred to the next record disk, the rollers of the arm 43 will leave the lever 40 with which they had been in engagement, (thus releasing said lever and permitting the wheel 38 to move, by the action of gravity, away from the driving wheel and the disk carried by this shaft to be stopped) and engage the next lever 40 and throw the next record disk into operation, in the same manner as previously explained.

It is apparent that means must be provided to cause the reproducer to move laterally so that it may be transferred from one disk to another when raised as previously explained. The means which I employ for moving the reproducer and the horn tubes with which the same is connected, will now be described. A gear wheel 45 is mounted horizontally upon the upper frame 2 and in its upper face near its toothed periphery, this wheel is provided with a plurality of notches 46 corresponding in number with that of the record disks employed. A pusher 47 is adapted to engage in any one of the notches 46 and is retained therein by a spring arm 48 by means of which said pusher is carried, the inner end of said spring arm being secured to the head 14 at the upper end of the vertical horn tube 12. The pusher engages one side of the horizontal horn arm 21 so as to move the same (and the reproducer carried thereby) laterally when the gear wheel 45 is slowly turned as presently explained.

It may sometimes be desired to play the same record twice, or to play some particular record in the series without successively playing the others. This may be accomplished by manually moving the reproducer and its horn tubes, and to facilitate such manual manipulation, the pusher 47 is provided with a handle 49 whereby it may be raised out of engagement with the notched wheel 45 and moved to another notch in said wheel opposite the disk which it is desirable to play,—the reproducer being also moved (manually) to proper position over such disk. When the reproducer is thus manually manipulated, the vertical horn tube 12 will be rotated and the coöperation of the arm 43 with the proper lever 40 will cause the disk it may be desired to play to be rotated in the manner previously explained.

The gear wheel 45 receives motion from a pinion 50 carried at the upper end of a shaft 51 mounted in the frames 2—3. The lower a worm 57 on the hub of the drive wheel 32. which receives motion from a worm 53 on a horizontal shaft 54, mounted in a bracket 55. A worm wheel 56 is fixed to the other end of the shaft 54 and receives motion from a worm 57 on the hub of the drive wheel 52.

It will require approximately one hour for the successive playing of ten records (including the time necessary for the transference of the reproducer from disk to disk) and consequently the gearing above described for moving the pusher 47 is so proportioned and timed that the gear wheel 45 will be caused to move very slowly in making one complete revolution in approximately one hour.

In operating the machine, all that is necessary, when the reproducer is properly set with respect to one of the disks, is to start the electric motor. The reproducer will move over the record toward the center thereof, and when the needle shall have fully traced the groove, the inclination of the disk will permit the reproducer to move promptly to the center of the disk, at which time the reproducer will be raised automatically by the operation of the devices hereinbefore described, and then lowered upon the next disk near the peripheral portion thereof, when the inclination of this disk will permit the needle of the reproducer to promptly move to the groove in the disk. In the meantime the rotation of the first disk will have been stopped and the rotation of the next disk started, in the manner previously explained.

Various slight changes might be made in the details of construction of my invention without departing from the spirit thereof or limiting its scope and hence I do not wish to restrict myself to the precise details herein set forth.

Having fully described my invention what I claim as new and desire to secure by Letters Patent, is:—

1. A talking machine comprising a circular series of record supports, operating means therefor, a reproducer mounted concentrically within said circular series of record supports, and means operating automatically to move the reproducer successively from one record to another.

2. A talking machine comprising a circular series of record supports, means for rotating said supports successively, a reproducer mounted concentrically within said circular series of record supports, and means for moving said reproducer successively from one record to another.

3. A talking machine comprising a circular series of record supports, driving means common to all of said supports, means operating automatically to bring said supports into and out of operative relation to said driving means successively, a reproducer mounted concentrically within said circular series of record supports, and means operating automatically to shift said reproducer successively from record to record.

4. A talking machine comprising a circular series of overlapping inclined record disks, a support for each disk, means for rotating said supports successively, a reproducer mounted concentrically within said circular series of record supports, and means operating automatically to shift said reproducer successively from one record disk to another.

5. A talking machine comprising a plurality of supports for record disks, means for rotating said supports, a pivotally mounted horn arm, a member hinged to said horn arm, a reproducer carried by said hinged member, a weighted arm connected with said hinged member, and means with which said weighted arm coöperates to raise the reproducer from one record disk and deposit it upon another, and means for simultaneously moving said reproducer and its horn arm laterally.

6. A talking machine, comprising a plurality of record disk supports, means for rotating said supports, a laterally movable horn arm, a member hinged thereto, a reproducer carried by the hinged member, an arm carried by said hinged member, a weight carried by said arm, a plurality of spaced lugs cooperable with said weight to cause the raising and lowering of the reproducer, and means for moving the reproducer and its horn arm laterally.

7. A talking machine, comprising a plurality of supports arranged to receive overlapping record disks, means for rotating each support, a laterally movable horn arm, a reproducer, a hinged member carrying the reproducer and connecting it with the horn arm, means for raising and lowering the reproducer, a pusher for moving the horn arm and reproducer laterally, and means for operating said pusher.

8. A talking machine, comprising a circular series of record disk supports arranged to receive a circular series of record disks, a horn arm, a member hinged thereto, a reproducer carried by the hinged member, an arm on the hinged member, a weight carried by said arm, a stationary ring, a circular series of beveled lugs with which said weight coöperates to cause the raising and lowering of the reproducer, and means for moving the horn arm and reproducer laterally.

9. A talking machine comprising a plurality of record disk supports, a laterally movable horn arm, a reproducer connected therewith, driving means for said supports, a pusher for moving said horn arm laterally, a traveling member with which said pusher is connected, and gearing between said driving means and traveling member for operating the latter to move the pusher.

10. A talking machine, comprising a plurality of record disk supports, a laterally movable horn arm, a reproducer carried by said horn arm, driving means for said supports, a traveling member, a pusher for the horn arm adjustable to different positions on said traveling member, and gearing between said driving means and traveling member for operating the latter to move said pusher.

11. A talking machine comprising a plurality of record disk supports, a laterally movable horn arm, a reproducer carried by said horn arm, driving means for said supports, a traveling member having a plurality of recesses, a pusher for the horn arm adapted to enter any one of said recesses, a spring arm carrying said pusher and secured to a part movable with the horn arm, and gearing between said driving means and traveling member for operating the latter to move said pusher.

12. A talking machine, comprising a circular series of record disk supports, a laterally movable horn arm movable over record disks on said supports, a reproducer carried by said horn arm, driving means for said disk supports, a horizontal gear wheel, a pusher for the horn arm movable by said gear wheel, a vertical shaft, a pinion carried by said shaft and meshing with said gear wheel, a worm wheel carried by said vertical shaft, a horizontal shaft, a worm carried by the horizontal shaft and meshing with said worm wheel, a worm wheel carried by the horizontal shaft, and a worm on the driving means and meshing with said last-mentioned worm wheel.

13. In a talking machine, the combination with framework, of a circular series of upright laterally movable shafts, disk carrying platforms at the upper ends of said shafts, wheels at the lower ends of said shafts, a central driving wheel, a horn tube arranged axially with respect to the driving wheel, a horn arm movable with said horn tube, a reproducer carried by said horn arm, means for moving said horn tube and horn arm progressively, a plurality of pivoted levers corresponding in number with the number of upright shafts, means connecting one arm of each of said levers with one of said upright shafts, and an arm carried by and movable with the vertical horn tube and cooperable with said levers progressively to move the wheels at the lower ends of the upright shafts progressively into operative relation to the driving wheel.

In testimony whereof, I have signed this specification in the presence of two subscribing witnesses.

WILLIAM H. DAILY.

Witnesses:
W. A. SMITH,
JOHN W. MARTIN.